United States Patent
Vogel et al.

(10) Patent No.: US 12,172,247 B2
(45) Date of Patent: Dec. 24, 2024

(54) METHODS FOR WELDING WITH A POWER SUPPLY WITH OUTPUT RECTIFIER AND PHASE SHIFT DOUBLE FORWARD CONVERTER

(71) Applicant: Illinois Tool Works Inc., Glenview, IL (US)

(72) Inventors: Bernard J. Vogel, Troy, OH (US); Adam E. Anders, Oshkosh, WI (US); Dennis R Sigl, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 793 days.

(21) Appl. No.: 17/330,585

(22) Filed: May 26, 2021

(65) Prior Publication Data

US 2021/0362262 A1    Nov. 25, 2021

Related U.S. Application Data

(62) Division of application No. 15/955,956, filed on Apr. 18, 2018, now Pat. No. 11,033,977.

(Continued)

(51) Int. Cl.
*B23K 9/10* (2006.01)
*B23K 9/067* (2006.01)
*B23K 9/09* (2006.01)
*B23K 9/173* (2006.01)
*B23K 9/29* (2006.01)

(Continued)

(52) U.S. Cl.
CPC .......... *B23K 9/1056* (2013.01); *B23K 9/0671* (2013.01); *B23K 9/091* (2013.01);

(Continued)

(58) Field of Classification Search
None
See application file for complete search history.

(56) References Cited

U.S. PATENT DOCUMENTS

| | | |
|---|---|---|
| 8,179,100 B2 | 5/2012 | Vogel |
| 8,455,794 B2 | 6/2013 | Vogel |

(Continued)

FOREIGN PATENT DOCUMENTS

| | | | |
|---|---|---|---|
| JP | 2002176769 A | * | 6/2002 |
| JP | 2012060796 A | * | 3/2012 |

(Continued)

OTHER PUBLICATIONS

Machine translation of KR20130029014-A (Year: 2024).*

(Continued)

*Primary Examiner* — Geoffrey S Evans
(74) *Attorney, Agent, or Firm* — McAndrews, Held & Malloy, Ltd.

(57) ABSTRACT

A method and apparatus for providing welding type power includes a phase shifted double forward converter having a first and second converter with a controller and an output rectifier. The output rectifier has at least one cathode current path that creates a cathode magnetic field when current flows in the cathode current path. The output rectifier also has at least one anode current path that creates an anode magnetic field when current flows in the anode current path. The cathode current path is disposed and oriented and the anode current path is disposed and oriented such that the cathode magnetic field acts to at least partially cancel the anode magnetic field.

8 Claims, 13 Drawing Sheets

Related U.S. Application Data

(60) Provisional application No. 62/488,488, filed on Apr. 21, 2017.

(51) Int. Cl.
  *H02M 3/28* (2006.01)
  *H02M 3/33* (2006.01)
  *H02M 3/335* (2006.01)
  *H02M 1/00* (2006.01)

(52) U.S. Cl.
  CPC .......... *B23K 9/1012* (2013.01); *B23K 9/1043* (2013.01); *B23K 9/173* (2013.01); *B23K 9/295* (2013.01); *H02M 3/285* (2013.01); *H02M 3/33507* (2013.01); *H02M 3/3353* (2013.01); *H02M 1/0025* (2021.05)

(56) References Cited

U.S. PATENT DOCUMENTS

| | | | |
|---|---|---|---|
| 8,952,293 B2 | 2/2015 | Vogel | |
| 2001/0045639 A1 | 11/2001 | Hanamura | |
| 2008/0035435 A1* | 2/2008 | Anastas | G06F 3/016 188/161 |
| 2009/0230941 A1* | 9/2009 | Vogel | B23K 9/1043 323/305 |
| 2010/0225280 A1 | 9/2010 | Vogel | |
| 2011/0032733 A1* | 2/2011 | Watanabe | H02M 3/1584 363/21.14 |
| 2011/0298433 A1* | 12/2011 | Tam | H01F 38/00 323/282 |

FOREIGN PATENT DOCUMENTS

| | | | |
|---|---|---|---|
| JP | 2016 059094 A | | 4/2016 |
| KR | 20130029014 A | * | 3/2013 |

OTHER PUBLICATIONS

Machine translation of Japan Patent No. 2002176679-A (Year: 2024).*
Machine translation of JP-2012060796-A, Aug. 2024 (Year: 2024).*
International Search Report and Written Opinion of the International Searching Authority, Aug. 27, 2018, European Patent Office, 2280 HV Rijswijk Netherlands.

* cited by examiner

METHODS FOR WELDING WITH A POWER SUPPLY WITH OUTPUT RECTIFIER AND PHASE SHIFT DOUBLE FORWARD CONVERTER

RELATED APPLICATIONS

This is a divisional of, and claims the benefit of the filing date of, U.S. patent application Ser. No. 15/955,956, filed on Apr. 18, 2018, and claims the benefit of the filing date of, U.S. Provisional Patent Application No. 62/488,488, filed on Apr. 21,2017.

FIELD OF THE INVENTION

The present disclosure relates generally to the art of welding type power supplies and providing welding type power. More specifically, it relates to welding type power supplies and providing welding type power using a phase shifted double forward (PSDF) converter.

BACKGROUND OF THE INVENTION

This disclosure is an improvement to the welding type power supply shown in U.S. Pat. No. 8,952,293 and U.S. Pat. No. 8,455,794, both of which are incorporated by reference and will be used as the basis for the background and description of PSDF in a welding or cutting application. This improvement could also be applied to a PSDF used in a battery charger, such as U.S. Pat. No. 8,179,100, hereby incorporated by reference.

Welding type power, as used herein, refers to power suitable for welding, plasma cutting, induction heating and/or hot wire welding/preheating (including laser welding and laser cladding). Welding type power circuit, as used herein, refers to power circuitry that receives an input power and provides welding type power. Welding type power supply, as used herein, refers to a power supply that can provide welding type power. Welding type output current, as used herein, refers to current suitable for welding, plasma cutting, induction heating and/or hot wire welding/preheating (including laser welding and laser cladding).

There are two modes of operation of the PSDF welding power supply. The first mode is "in-phase", whereby the two forward converters operate in phase, meaning their respective PWM ON and OFF periods are in sync. The second mode is "phase shifted" whereby the first and second converters have some relative phase shift between their respective PWM ON and OFF periods. It is generally desirable to operate the two converters in phase to the extent possible, and only shift out of phase to meet higher dynamic output load requirements (meaning higher load voltages and/or faster di/dt current transitions at high currents). To this extent it is desirable to maximize the range of operation that can be provided with the converters operating in-phase such that they can provide the rated or average load requirements under all rated conditions. It is also desirable to reduce or minimize the non-linearity in the control as the two converters shift in and out of phase. In addition, it is desirable that the two converters carry relatively the same current when they are operating in-phase such that they have similar thermal loads, as well as provide relatively matched loads when operating from a series or stacked DC bus arrangement. It is desirable in a series or stacked arrangement that the two converters have matched loads to avoid a tendency to generate a mismatch of the voltages for the series arrangement of the DC bus.

Parasitic inductances or leakage inductances can have a detrimental effect on the ability to meet the several desirable conditions. Larger values of parasitic or leakage inductance for in-phase operation will reduce the window of operation, meaning a reduction of the maximum load voltage that can be met for in-phase operation at higher currents. Higher values of parasitic inductance for phase-shifted operation can increase the effect of the non-linearity in the control as the two converters shift in and out of phase. A mismatch in parasitic or leakage inductance between the two converters while operating in-phase can lead to a mismatch in load currents which can lead to a mismatch in their thermal behavior as well as lead to a mismatch in DC bus voltages for a series or stacked arrangement of the two converters.

These detrimental effects of parasitic and leakage inductance may be less of an issue for low current (ex. 100-150 Amps) operation of the PSDF welding power supply. This can include operation of the two converters where they only shift out of phase at low or reduced output current (ex. 40-80 Amps). However, for high current operation (ex. 200-400 Amps), including operation where the two conveners may need to shift out of phase at full load current or in fact at an output current in excess of the maximum "rated" load current (ex. 400-600 Amps), these detrimental effects can have a more significant impact on the operation of the two converters.

Accordingly, a welding type power supply having at least one forward converter (including a PSDF) that reduces the leakage and/or parasitic circuit inductance is desirable.

SUMMARY OF THE PRESENT INVENTION

This disclosure describes an output rectifier arrangement suitable for high current operation of the PSDF welding power supply that reduces or minimizes the leakage or parasitic circuit inductance for in-phase as well as phase shifted operation. In addition, it describes an arrangement with closely matched parasitic inductance for the two converters to reduce or minimize the mismatch in current for in-phase operation. It also provides for a means of conducting the accumulated DC current to the welding power supply load while simultaneously minimizing the parasitic circuit inductance.

According to a first aspect of the disclosure a welding type power supply includes a forward converter, a controller connected to the forward converter and an output rectifier. The forward converter receives input power and provides a converter output current. The controller controls the switching of the forward converter. The output rectifier receives the converter output current and provides at least a part of a welding type output current. The output rectifier includes at least a first diode, and has a first diode current path that carries a first diode current. The first diode current path includes a first cathode current path, the first diode and a first anode current path. When the first diode current flows in the first cathode current path it creates a first cathode magnetic field, and when the first diode current flows in the first anode current path it creates a first anode magnetic field. The first cathode current path and the first anode current path are disposed and oriented such that the first cathode magnetic field acts to at least partially cancel the first anode magnetic field. The first diode current is at least a portion of the at least a part of the welding type output current.

According to a second aspect of the disclosure a method of providing welding type power includes receiving input power in a forward converter, switching the forward converter to provides a converter output current and rectifying the converter output current to provide at least a part of a welding type output current. Rectifying further includes providing a first rectified current through a first rectified current path that includes a first cathode current path and a first anode current path. When the first rectified current flows in the first cathode current path it creates a first cathode magnetic field, and when the first rectified current flows in the first anode current path it creates a first anode magnetic field. The first anode magnetic field and the first cathode magnetic field at least partially cancel one another.

According to a third aspect of the disclosure a method of making a welding type power supply includes providing a phase shifted dual forward converter, providing a controller to control the phase shifted dual forward converter, and providing a rectifier to rectify an output of the phase shifted dual forward converter. Providing a rectifier includes locating a first converter forward diode cathode, a first converter freewheeling diode cathode, a second converter forward diode cathode, and a second converter freewheeling diode cathode on a first layer of a laminated bus and/or printed circuit board. It also includes locating a first converter forward diode anode, a first converter freewheeling diode anode, a second converter forward diode anode, and a second converter freewheeling diode anode on a second layer of the at least one of the a laminated bus and/or printed circuit board. The first layer is located near the second layer to at least partially cancel magnetic fields from the anodes with magnetic fields from the cathodes.

The first diode is a freewheeling diode and the output rectifier further includes at least one forward diode and has a forward diode current path that carries a forward current in one alternative. The for diode current path includes a forward cathode current path, the at least one forward diode and a forward anode current path. When the forward current flows in the forward cathode current path it creates a forward cathode magnetic field, and when the forward current flows in the forward anode current path it creates a forward anode magnetic field. The forward cathode current path and the forward anode current path are disposed and oriented such that the forward cathode magnetic field acts to at least partially cancel the forward magnetic field. The forward current is at least a second portion of the at least a part of the welding type output current.

The cathode and anode current paths are disposed and oriented such that the first cathode magnetic field cancels the first anode magnetic field in another embodiment.

The freewheeling and forward cathode current paths are at least partially shared, and the freewheeling and forward anode current paths are at least partially shared in yet another embodiment.

A second forward converter receives the input power and provides a second converter output current in another alternative. The controller is connected to and controls the switching of the second forward converter. The controller is a phase shifted dual forward converter controller, and the first and second forward converters are connected as a phase shifted dual forward converter. A second output rectifier receives the second converter output current and provides at least a second part of the welding type output current. The second output rectifier includes at least a second freewheeling diode and has a second freewheeling diode current path that carries a second freewheeling current. The second freewheeling diode current path includes a second freewheeling cathode current path, the at least a second freewheeling diode and a second freewheeling anode current path. When the second freewheeling diode current flows in the second freewheeling cathode current path it creates a second freewheeling cathode magnetic field, and when the second freewheeling diode current flows in the second freewheeling anode current path it creates a second freewheeling anode magnetic field. The second freewheeling cathode current path and the second freewheeling anode current paths are disposed and oriented such that the second freewheeling cathode magnetic field acts to at least partially cancel the second freewheeling anode magnetic field. The second freewheeling diode current is at least a third portion of the at least a second part of the welding type output current. The output rectifier includes at least a second forward diode and has a second forward diode current path that carries a second forward current. The second forward diode current path includes a second forward cathode current path, the at least a second forward diode, and a second forward anode current path. When the second forward current flows in the second forward cathode current path it creates a second forward cathode magnetic field, and when the second forward current flows in the second forward anode current path it creates a second forward anode magnetic field. The second forward cathode current path and the second forward anode current path are disposed and oriented such that the second forward cathode magnetic field acts to at least partially cancel the second forward anode magnetic field. The second forward current is at least a fourth portion of the at least a second part of the welding type output current. The cathode current paths are at least partially shared, and the anode current paths are at least partially shared.

One or more of the diodes are banks of diodes in various embodiments.

The cathode current paths are at least partially disposed on a first layer of a laminated bus and/or printed circuit board, and the first anode current paths are at least partially disposed on a second layer of the laminated bus and/or printed circuit board in another embodiment.

The first layer is within 0.01 inches of the second layer in yet another embodiment.

The cathode current paths includes multiple collection points in one alternative.

Input power is received by a second forward converter which is switched to provides a second converter output current, and the second converter output current is rectified to provide at least a second part of a welding type output current in another embodiment. The forward converters are phase staggered dual forward converters. Rectifying the second converter output current includes providing a second rectified current through a second rectified current path that includes a second freewheeling cathode current path and a second freewheeling anode current path. When the second rectified current flows in the second freewheeling cathode current path it creates a second freewheeling cathode magnetic field, and when the second rectified current flows in the second freewheeling anode current path it creates a second freewheeling anode magnetic field. The second freewheeling anode magnetic field and the second freewheeling cathode magnetic field at least partially cancel one another. Rectifying also includes providing the second rectified current through a second forward cathode current path and a second forward anode current path. When the second forward current flows in the second forward cathode current path it creates a second forward cathode magnetic field, and when the second forward current flows in the second forward anode current path it creates a second forward anode magnetic field. The second forward anode magnetic field and the second forward cathode magnetic field at least partially cancel one another. The anode current paths are at least partially shared.

Other principal features and advantages of will become apparent to those skilled in the art upon review of the following drawings, the detailed description and the appended claims.

Figure 1:
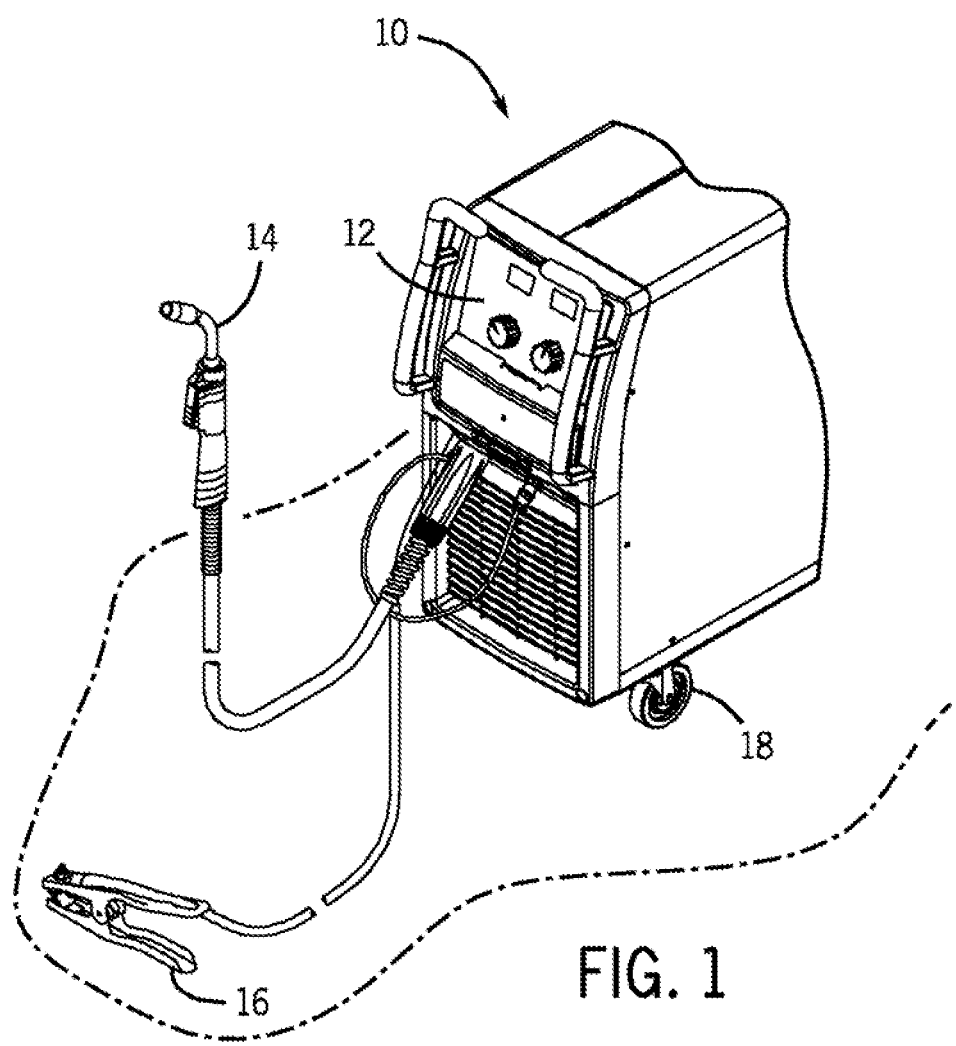
FIG. 1 is a perspective view of an exemplary welding type power supply unit in accordance with aspects of the present disclosure.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular circuits and construction it should be understood at the outset that the output rectifier could be implemented with other circuits and/or other constructions.

The output rectifier will be described with respect to the circuit shown in the '293 patent, and the circuit and control will be the same as that described in the '293 circuit, except as otherwise discussed.

FIG. 1 illustrates an exemplary welding type power supply unit 10 which powers, controls, and provides supplies to a welding or cutting operation in accordance with aspects of the present invention. The side of power supply unit 10 that faces the user contains a control panel 12, through which the user may control the supply of materials, such as power, gas flow, wire feed, and so forth, to a welding or cutting torch 14. A work lead clamp 16 typically connects to a workpiece to close the circuit between torch 14, the work piece, and supply unit 10, and to ensure proper current flow. It should be noted that in some embodiments, such as for stick welding operations, torch 14 may be an electrode. The portability of unit 10 depends on a set of wheels 18, which enable the user to move power supply unit 10 to the location of the weld.

Figure 2:
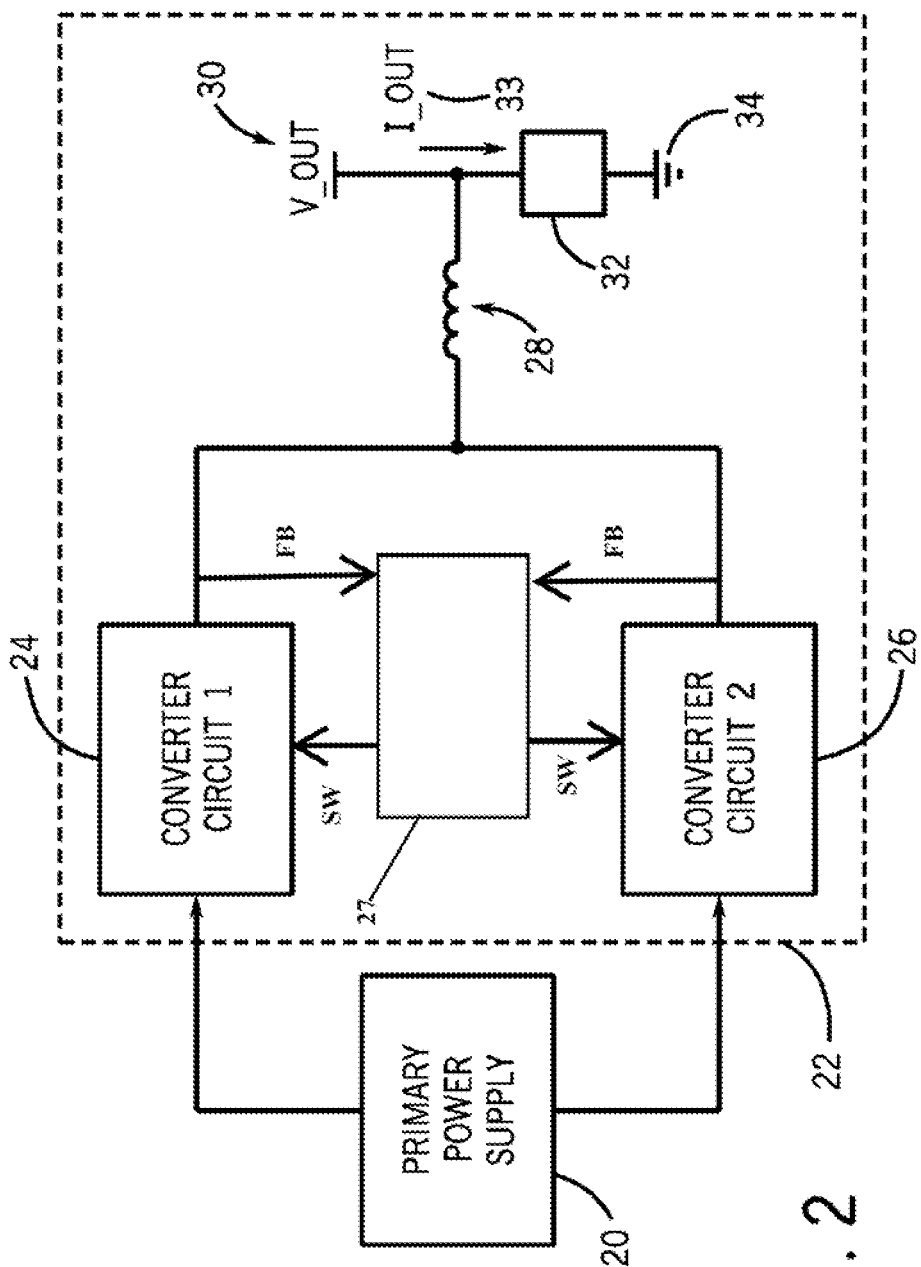
FIG. 2 is a block diagram of the components of art exemplary welding type power supply in accordance with aspects of the present disclosure.

Internal components of power supply unit 10 convert input power (from a wall outlet or other source of AC or DC voltage, such as a generator, batters or other source of power) to an output consistent with the voltage, current, and/or power, requirements of a welding or cutting arc maintained between the workpiece and welding torch 14. FIG. 2 illustrates an exemplary block diagram of components that may be included in the welding or plasma cutting power supply unit 10. Specifically, FIG. 2 illustrates a primary power supply 20 which receives input power and in operation, outputs direct current (DC) to a power circuit 22 comprising a fast converter circuit 24 and a second converter circuit 26. Converter circuits 24, 26 operate to combine their respective outputs at a single node, which feeds into a filter inductor 28 that supplies an output voltage 30 (i.e. V_out) for the welding or cutting operation. A welding or cutting arc 32 is supplied with a welding or cutting current 33 and is connected to ground 34. In one embodiment, individual inductors may be utilized in place of filter inductor 28. In other embodiments, inductor 28 may have multiple windings used to combine the outputs of converter circuits 24, 26.

A controller 27 controls the switching in the PSDF. Controller 27 may be consistent with, or even identical to, controllers in the prior art. Controller 27 provides switching signals SW to and receives feedback FB from converters 24, 26. Controller, as used herein, refers to digital and analog circuitry, discrete or integrated circuitry, microprocessors, DSPs, FPGAs, etc., and software, hardware and firmware, located on one or more boards, used to control all or part of a welding-type system or a device such as a power supply, power source, engine or generator. Control module, as used herein, may be digital or analog, and includes hardware or software, that performs a specified control function. Module, as used herein, includes software and/or hardware that cooperates to perform one or more tasks, and can include digital commands, control circuitry, power circuitry, networking hardware, etc.

In one embodiment, power supply 20 may be a DC source, such as a battery. In other embodiments, power supply 20 may be a circuit that rectifies incoming alternating current (AC), converting it to DC. In the exemplary block diagram shown in FIG. 2, each of converter circuits 24, 26 are connected to primary power supply 20. In other embodiments, circuits 24, 26 may be powered from separate power supplies. In further embodiments, circuits 24, 26 may be connected in parallel or series to primary power supply 20 at a capacitor 36 and a capacitor 56 of converter circuits 24, 26. In the embodiment where circuits 24, 26 are connected in series with a single primary power supply 20, each converter circuit would only receive half the total voltage of primary power supply 20, which may allow for the use of lower voltage components within converter circuits 24, 26.

Figure 3:
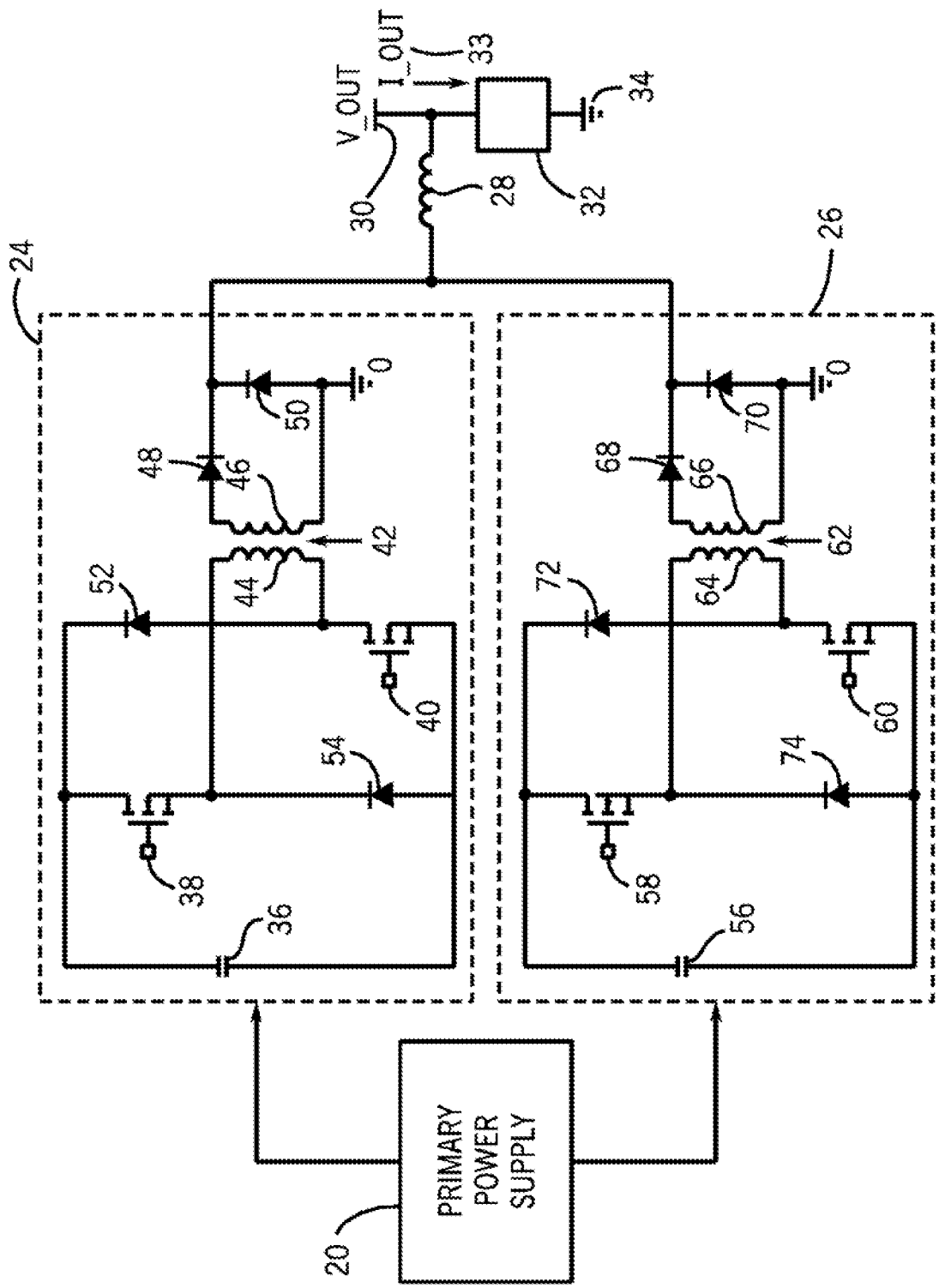
FIG. 3 is a circuit diagram illustrating a PSDF converter.

FIG. 3 is a circuit diagram illustrating one embodiment of welding type power supply 22 comprising two forward converter circuits 24, 26 in accordance with one embodiment. As previously described, primary power supply 20 provides DC power to first converter circuit 24 and second converter circuit 26. In first inverter circuit 24, a voltage is first supplied across capacitor 36. A pair of power semiconductor switches 38, 40 then chop the DC voltage and supply it to a transformer 42 on the side of a primary winding 44 of transformer 42. Transformer 42 transforms the chopped primary voltage to a secondary voltage, at a level suitable for a cutting or welding arc, and supplies it to a secondary winding 46 of transformer 42. The secondary voltage is then rectified by a pair of rectifier diodes 48, 50 and supplied to filter inductor 28. A set of diodes 52, 54 provide a freewheeling path for the magnetizing current stored in transformer 42 to flow when semiconductor switches 38, 40 turn off, and thus reset the magnetic flux or energy stored in the transformer core.

Similarly, in second inverter circuit 26, a voltage is first supplied across capacitor 56. A pair of power semiconductor switches 58, 60 then chop the DC voltage and supplies it to a transformer 62 on a side of a primary winding 64 of transformer 62. Transformer 62 transforms the chopped primary voltage to a secondary voltage and supplies it to a secondary winding 66 of transformer 62. The secondary voltage is then rectified by a set of rectifier diodes 68, 70 and supplied to filter inductor 28. A set of diodes 72, 74 provide a free-wheeling path fix the magnetizing current stored in transformer 62 to flow when semiconductor switches 58, 60 turn off, and thus reset the magnetic flux or energy stored in the transformer core.

The combined rectified secondary voltage is supplied to welding or cutting power supply output 30 and welding or cutting current 32 is output from circuits 24, 26. In other embodiments, forward converter circuits 24, 26 may include additional components or circuits, such as snubbers, voltage clamps, resonant "lossless" snubbers or clamps, gate drive circuits, pre-charge circuits, pre-regulator circuits, and so forth. Further, as previously noted, forward converter circuits 24, 26 may be arranged in parallel or in series in accordance with present embodiments, meaning that capacitors 36, 56 may be connected in series or in parallel. Additionally, in further embodiments, the output of first converter circuit 24 and the output of second converter circuit 26 may be connected in series, In this embodiment, a single ground would be configured to support both circuits 24, 26, and the output of diodes 48, 50 of first converter circuit 24 would couple with the output of diodes 68, 70 of second converter circuit 26 before entering inductor 28. A more detailed description of the circuit's operation is found in the '293 patent.

Figure 4:
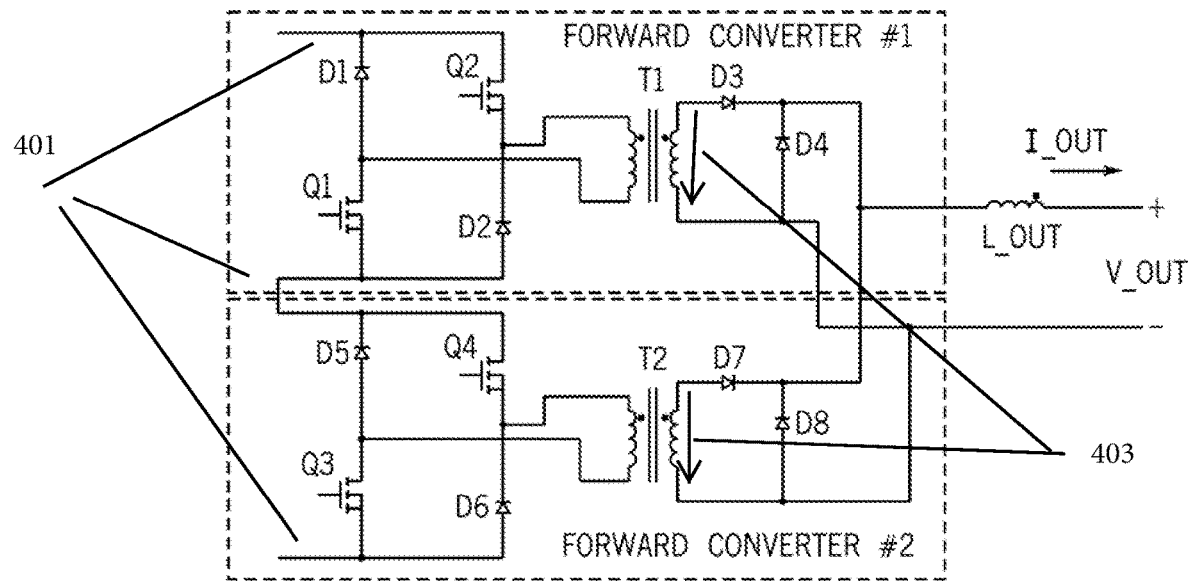
FIG. 4 is a circuit diagram illustrating an ideal PSDF converter.

FIG. 4 shows two forward converters comprising the PSDF welding power supply. The two forward converters are shown with ideal components. The PSDF receives input power 401 (from a wall outlet or other source of AC or DC voltage, such as a generator, battery, a primary power supply or other source of power and through primary power supply 20), and can have an input rectifier to provide a dc signal to the converters. The two converters are shown in a series or stacked arrangement on the primary or input to the converters. A pair of switches Q1, Q2 form the switches for converter #1 and switches Q3, Q4 form the switches for converter #2. Although shown as individual Mosfets they may be comprised of an arrangement of multiple Mosfets, IGBTs or other devices operating in parallel as required to handle the current and power rating of the converter. Each converter provides a converter output current 403 to an output rectifier which includes diodes D3, D4 or D7, D8. Diode, as used herein, refers to a single diode or a diode bank arranged in parallel.

Diodes D1, D2 are the primary free-wheel diodes that carry the magnetizing current when switches Q1, Q2 switch off and provide a path to reset the transformer magnetization current. As with switches Q1, Q2 they may be comprised of multiple diodes in a parallel arrangement. Diode D3 is the forward rectifying diode and carries the secondary current while switches Q1 and Q2 are ON. Diode D4 is the secondary free-wheel diode and carries the secondary current when switches Q1 and Q2 are OFF. Again diodes D3 & D4 may be comprised of multiple diodes in a parallel arrangement as required to handle the load current. Transformer T1 is shown as an ideal transformer and provides a turns ratio to provide the required secondary voltage as required by the welding power supply. A similar description applies to converter #2, which may operate in-phase with converter #1 or in a phase shifted manner. The accumulated secondary current for the two converters is combined and provided to the output (V_OUT) is an output circuit comprised of an output inductor (L_OUT).

Each forward converter provides part of the output currentI_OUT (so long as both are operating). The part of the output currentI_OUT provided by converter 1 flows through freewheeling diode D4 when converter one is off and it flows through forward diode D4 when converter 1 is on. The current through diodes D3 and D4 is described herein as the output of converter 1. The pan of the output currentI_OUT provided by converter 2 flows through freewheeling diode D8 when converter 2 is off, and it flows through forward diode D7 when converter 2 is on. Thus, a portion of the part of the output currentI_OUT provided by converter 1 flows through the freewheeling diode, and a portion flows through the forward diode. The current through diodes D7 and D8 is described herein as the output of converter 1. The Output currentI_OUT is the sum of the currents through diodes D3, D4, D7 and D8. Thus, the current through each of diodes D3, D4, D7 and D8 is a part of the welding type output currentI_OUT.

Figure 5:
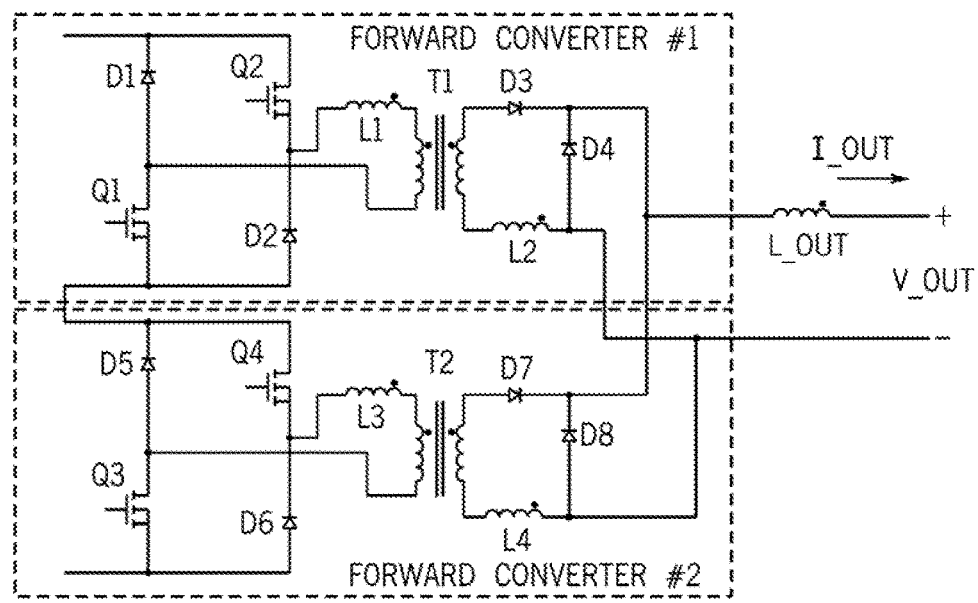
FIG. 5 is a circuit diagram illustrating a PSDF converter with parasitic inductance.

FIG. 5 shows two converters 1 and 2 but with additional circuit elements L1 ,L2, L3 & L4 representing parasitic circuit inductance which may be a result of leakage inductance in the transformer due to non-ideal coupling between the primary and secondary windings. The parasitic inductance may also be a result of wiring or conductors in the series path of current flow as required to physically connect the circuit elements together. Inductances L1 & L3 represent parasitic inductance within the wiring of the primary of the transformers as well as leakage inductance as represented on the primary side of the transformer. Likewise inductances L2 & L4 represent parasitic inductance within the wiring of the secondary of the transformers as well as leakage inductance of the transformer represented on the secondary side of the transformers.

The effect of inductances L2 & L4 may be more significant than the effect of inductances L1 & L3. If the secondary parasitic inductance is reflected to the primary so as to be modeled as a single lumped parasitic inductance, then the secondary inductance is multiplied by the turns ratio squared to determine the equivalent value. This squaring effect of the turns ratio can mean that a given inductance on the secondary is greatly increased when it is reflected to the primary. Reduction of parasitic circuit inductance on the secondary can have a significant impact on the performance and operation of the PSDF welding power supply.

Any conductor carrying current will have some self-inductance which is a function of the geometry of the conductor and generally increases as the length of the conductor increases. A mutual inductance effect occurs when two or more conductors are in close physical proximity and their magnetic fields interact. This mutual inductance effect can result in a net reduction of the effect of the self-inductance if the two conductors carry current in opposing directions. The self and mutual inductance effects of the secondary wiring and connections to the output diodes can comprise a significant portion of the equivalent parasitic inductance shown as inductances L2 & L4.

A self or mutual inductance can occur in a current path carrying DC current or AC current. Those parasitic self and mutual inductances that occur in a DC current path have little impact in the operation of the two converters of the PSDF welding power supply. The parasitic self or mutual inductance that occurs in a current path carrying AC current can have an impact on the operation of the PSDF welding power supply. As the forward converters turn ON the secondary current must shift from the freewheel path to the forward diode path. This can occur simultaneously for the two converters if they are operating in phase or out of sync if they are operating in a phase shift manner.

Figure 6:
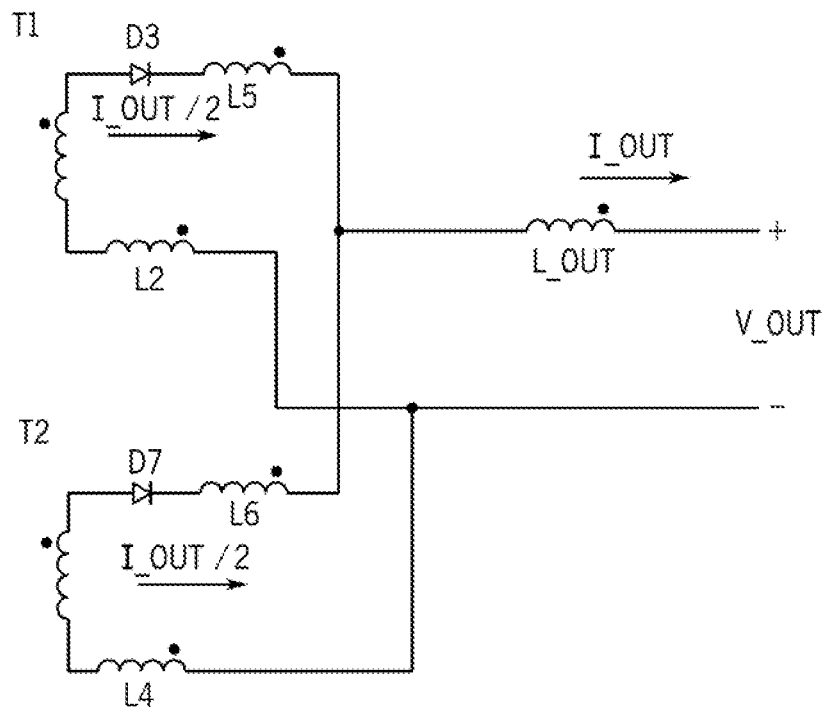
FIG. 6 is a circuit diagram illustrating the two forward converters operating in phase and in an ON condition.
Figure 7:
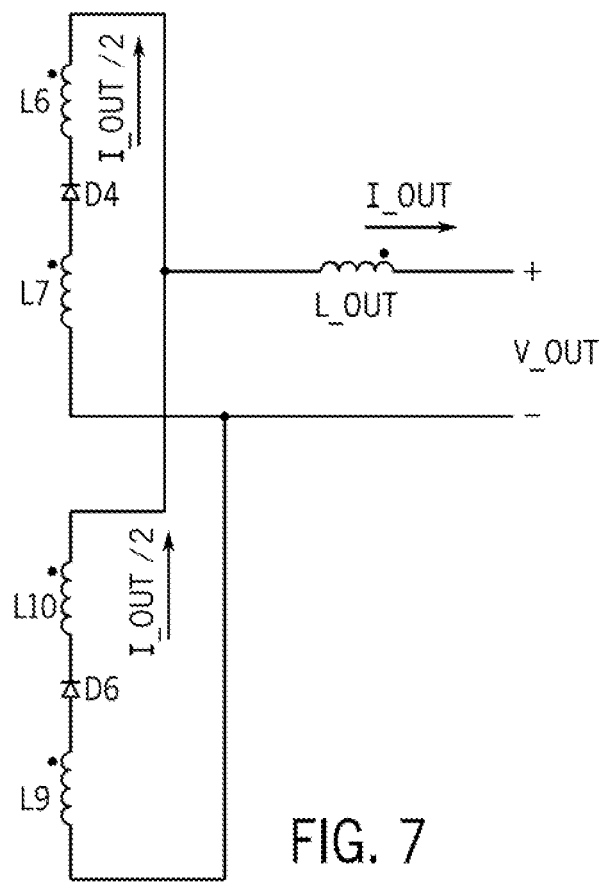
FIG. 7 is a circuit diagram illustrating the two forward converters in an OFF condition.

FIGS. 6 and 7 shows two conducting paths in the secondary circuit. FIG. 6 shows the two forward converters operating in phase and in an ON condition whereby the conduction path is through forward diodes D3, D7. FIG. 7 shows the condition where both converters are OFF and the output load current is freewheeling through diodes D4 and D6. As the current transitions between the two paths shown the current must first overcome the effect of the parasitic inductances shown in the two paths. Additional parasitic inductance elements are shown to represent the circuit conductor paths of both the anode and the cathode of the diodes.

Figure 8:
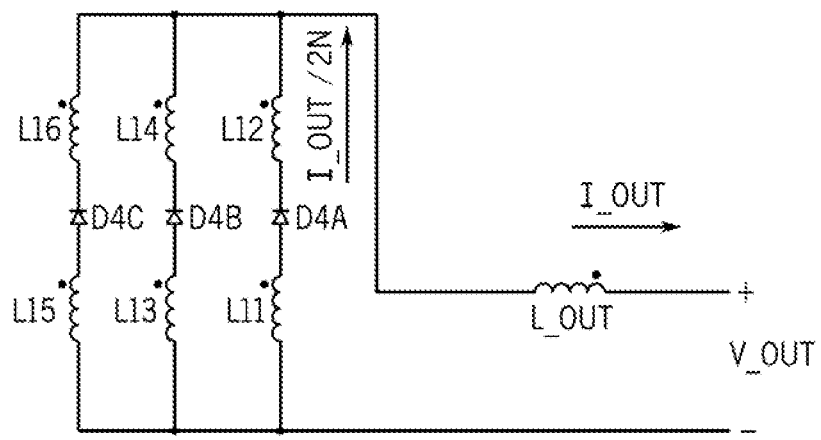
FIG. 8 is a circuit diagram illustrating multiple parallel physical diodes in the output rectifier.

FIG. 8 shows a schematic representation for one of the freewheel diodes physically consisting of 3 parallel devices each with its own parasitic inductance in the anode and cathode conducting paths. In this case the individual parasitic inductances can have a cumulative effect and can also have a detrimental effect on the current sharing between the individual diodes particularly if the inductances are of different values.

Figure 9:
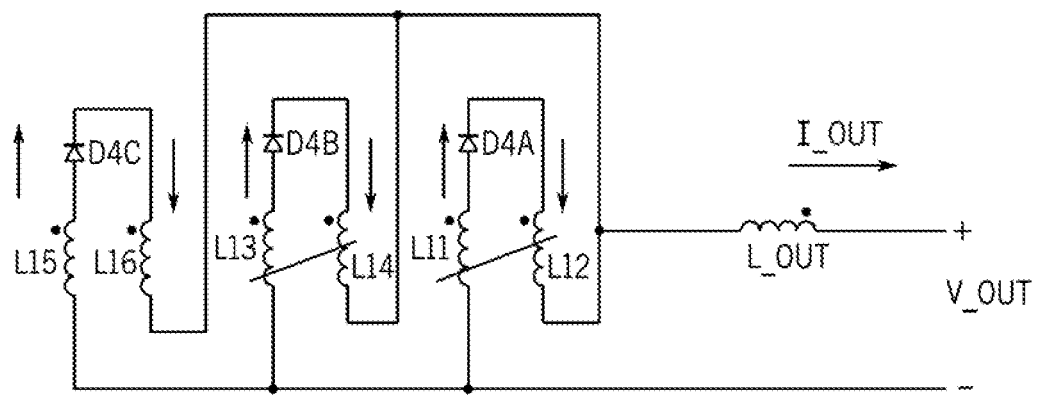
FIG. 9 is a circuit diagram illustrating mutual inductance.

FIG. 9 shows a slightly different schematic arrangement of the parasitic inductance elements. Schematically the inductances are shown in close proximity for the 3 parallel diodes comprising one of the freewheel diode paths. It also shows the current flowing in opposing directions in the pairs of parasitic inductances associated with each individual diode. A similar schematic arrangement could be shown for the forward diode paths as well as the other freewheel path shown in FIG. 7.

FIG. 9 is a schematic representation of a more ideal arrangement of diodes and parasitic circuit inductances. For this arrangement the mutual inductance effect provides a reduction in the total parasitic inductance by providing a current path for the cathode current in close proximity to the anode current but with current flowing in the opposite direction. This opposing current flow provides a cancellation effect of the cathode magnetic field and anode magnetic field, which results in a lower equivalent parasitic inductance for the total circuit The preferred embodiment provides for a physical layout of diodes that provides at least partial cancellation of magnetic fields. The magnetic fields can partially cancel or cancel. Magnetic fields partially cancel on another, as used herein, when the parasitic inductances or leakage inductances are reduced at least in half. Magnetic fields cancel on another, as used herein, when the parasitic inductances or leakage inductances are reduced at least by 75%. Cathode magnetic field, as used herein, refers to the magnetic field created by current flowing from the cathode of a device. Anode magnetic field, as used herein, refers to the magnetic field created by current to the anode of a device.

Figure 10:
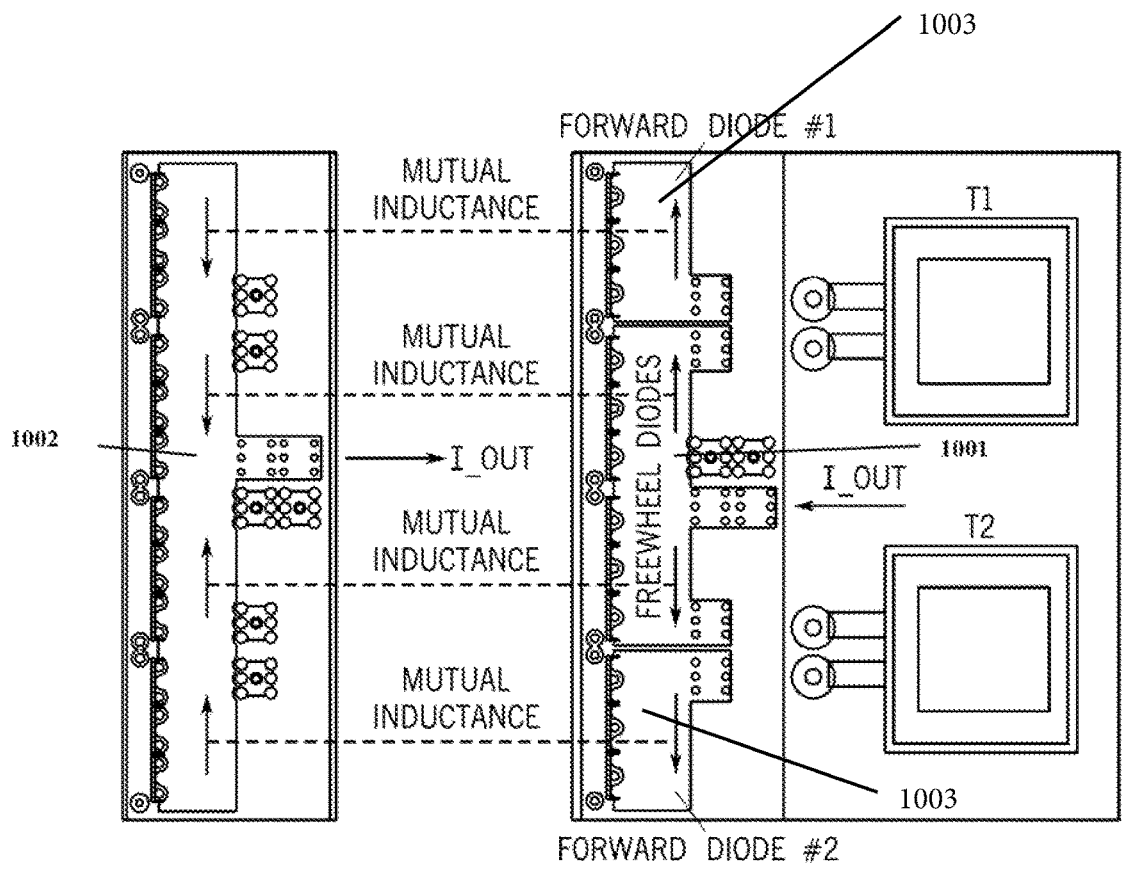
FIG. 10 is a representation of the physical output rectifier construction with mutual inductance cancellation.

FIG. 10 shows the preferred physical arrangement of the forward diode #1 and forward diode #2 (which correspond to diodes D3, D7 of FIGS. 4 and 5), and a bank for freewheel diodes for the two transformers of the PSDF welding power supply. Each diode bank is comprised of multiple parallel discrete diodes in this arrangement. This particular configuration is shown with multiple current conductors 1001 and 1002 (right and left) that may be constructed with a multiple layer printed circuit board (PCB) or with a laminated bus structure or a combination of the two. FIG. 10 shows a condition whereby the forward converters are in a PWM ON cycle with the two converters operating in phase. For this situation the total output current (I_OUT) enters current path 1001 near the center of the middle right anode current path/conductor and splits in two with half flowing upwards through the middle right anode conductor and half flowing downwards. The split currents then exit the conductors (PCB or laminated bus) and flow into T1 & T2. The split currents then exit the transformers and enter upper and lower right anode conductors 1003 which provide a connection point to the anodes of the multiple parallel discrete diodes that comprise the two forward diodes. Current paths 1001 and 1003 are shared current paths before the currents split (or are joined). A shared current path, as used herein, refers to a current path that includes current going to or coming from different devices.

The current flows from the anode to the cathode of each discrete diode comprising the two forward diode banks. The cathode current is collected by the left cathode conductor/current path 1002 which is a separate circuit layer of the PCB or laminated bus, but near (in close physical proximity such as 0.010" to 0065") to the right (anode layer). A layer is within a given distance of another, as used herein, when the shortest distance between a first plane including one layer and a second plane including the other layer is on average less than the given distance. The anode current paths are at least partially disposed on one layer, and the cathode current paths are at least partially disposed on another layer. The split output current flows towards the center of the left cathode conductor from both the upper and lower bank of forward diodes. The diode current paths are described as including the cathode current path which is the current path connected to the cathode, the diode, and the anode current path, which is the current path connected to the anode.

For both the right anode conductors and left cathode conductors there are equal and opposing currents flowing in the two layers of conductors. There is also good correlation of the geometry of the two layers of conductors such that the current flowing in one layer closely matches the current distribution flowing in the opposite layer providing good effective mutual inductance and cancellation of the self-inductance. There is very good symmetry between the two forward converter forward conduction paths (top and bottom right anode conductors), such that the parasitic inductance that remains is balanced between the two converters and allows for well-matched current flow.

Figure 11:
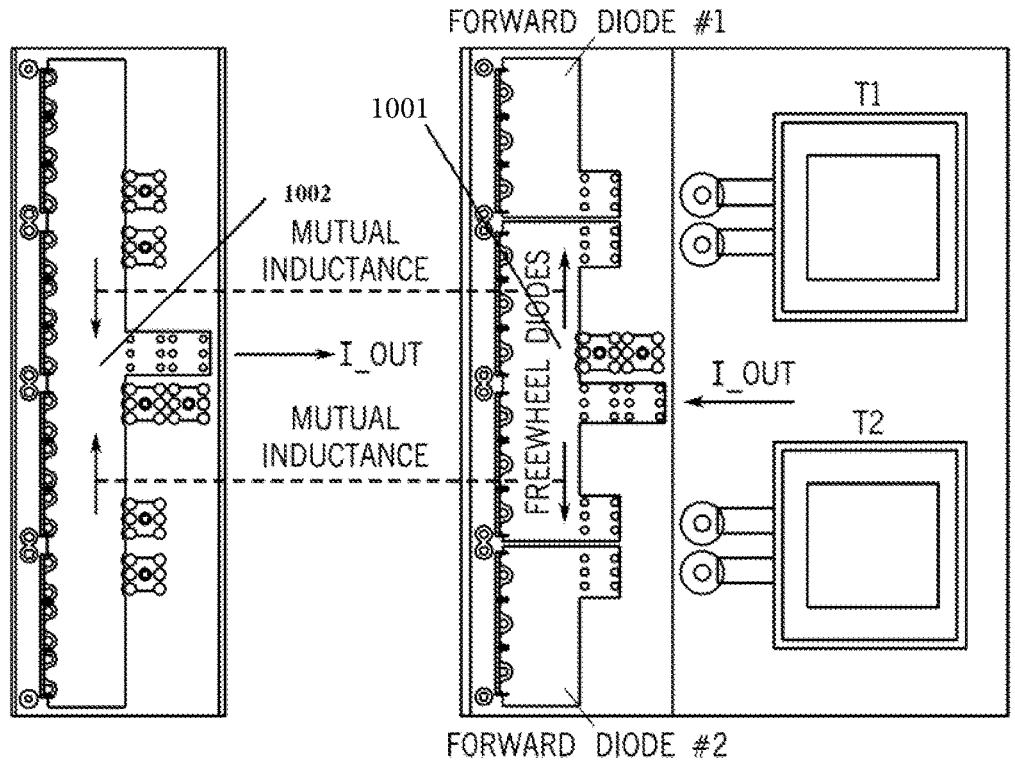
FIG. 11 is a representation of the free-wheel current flow for the physical output rectifier of FIG. 10.

FIG. 11 shows a representation of the current flowing during the freewheel period for the two converters. In this situation the total output current (I_OUT) enters the middle of the center right anode conductor and splits in half flowing upwards and downwards towards the bank of freewheel diode. The current then flows from the right anode conductor through the diodes and is collected by the left cathode conductor. Again it can be seen that the current flow in opposite direction between the two layers of conductors. This provides good mutual inductance with opposing current flow for the freewheel path which results in low parasitic self inductance.

A similar analysis can be done for the two forward converters operating in a phase shifted manner. For this situation the entire load current would enter the middle of the center right anode conductor and flow either upwards or downwards towards either T1 or T2 depending on which converter was ON. The current would exit the center conductor and flow through the transformer (either t1 or T2) and enter either the upper or lower right anode conductor. The current would flow through the associated forward diode and enter the left cathode conductor and flow in an equal and opposite direction and exit near the center of the cathode conductor.

Figure 12:
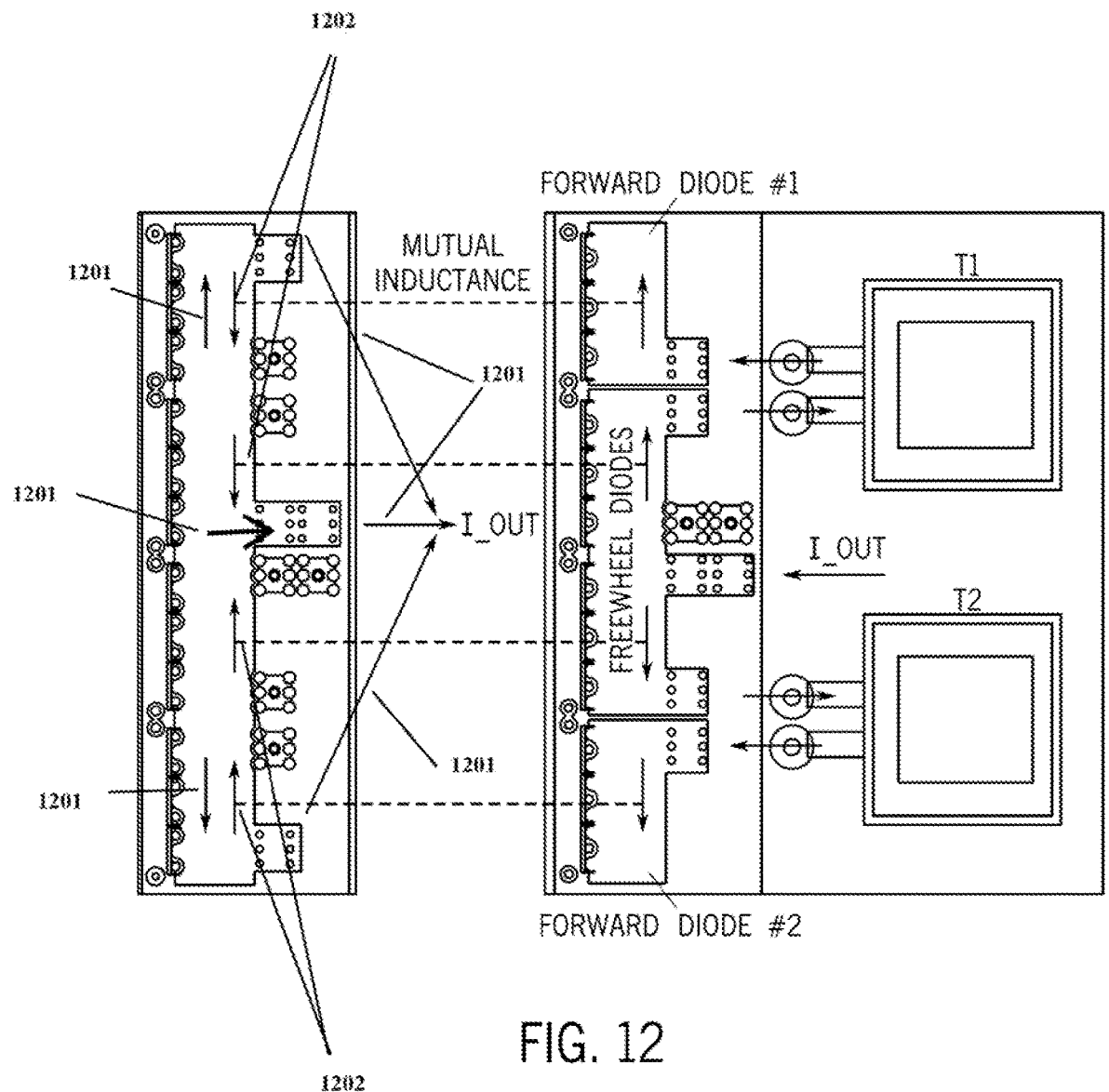
FIG. 12 is a representation of a conductor arrangement with additional DC current connections.

FIG. 12 shows a conductor arrangement with two additional DC current connections for the left cathode conductor, to accumulate the output current. This may be desirable to reduce the current density in the left cathode conductor for example. For this situation arrows 1201 leading to Iout represent the DC current flow and show more or less ⅓ of the total output current exit the 3 locations shown and accumulate to provide the total output current. Arrows 1202 leading to the center of conductor 1002 represent the AC current flow. So for example as the current transitions out of the freewheel diodes and into the forward diodes as the two forward converters enter their respective ON cycles, the current will transition into the upper and lower right anode conductors. It will then flow through the anodes of the parallel discrete diodes and enter the left cathode conductor. The current exiting the two banks of forward converter diode cathodes must equal the current that had flowed into the anodes of the diodes.

The net current flowing in the upper portion (and lower portion) of the left cathode conductor is not identical in magnitude to the current flowing in the right anode upper and lower conductors, however the net change in current is identical. The change in current (ie. AC current) is matched and provides current cancellation and the benefit of mutual inductance similar to what is achieved with a single DC current collection point.

Figure 13:
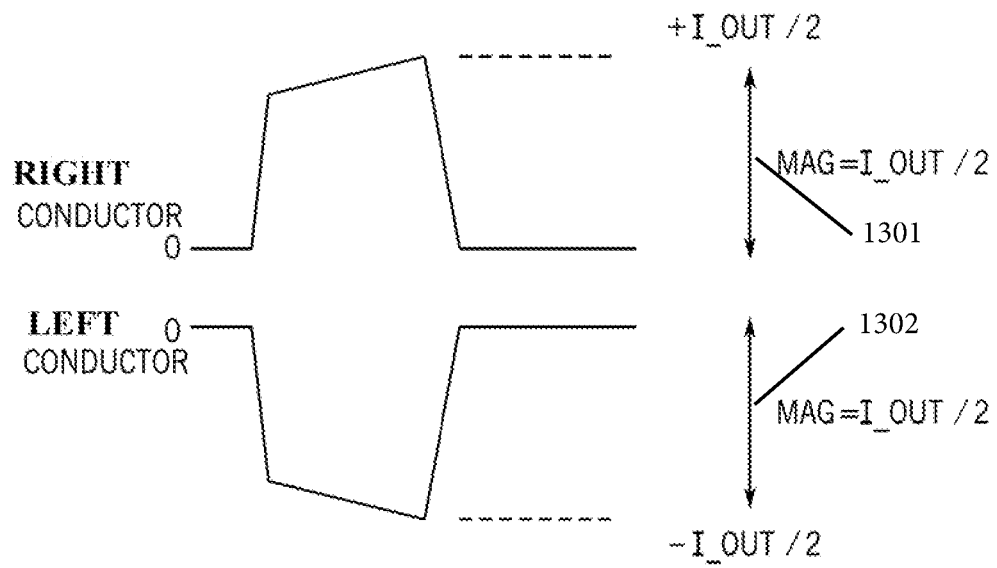
FIG. 13 is a representation of the current flowing with a single DC collection point.

FIG. 13 illustrates the current flowing in the upper right anode conductor and the upper portion of the left cathode conductor with a single DC collection point near the center of the left cathode conductor. This figure illustrates equal magnitudes and opposite current flow direction (assuming positive current flow is flowing away from the center towards the top of the conductors). So as the right anode conductor current and the right anode magnetic field 1301 increases from 0 to +I_OUT/2 the current in the opposing left cathode conductor and the left cathode magnetic field 1302 is changing from 0 to −I_OUT/2, an equal and opposite change in current.

Figure 14:
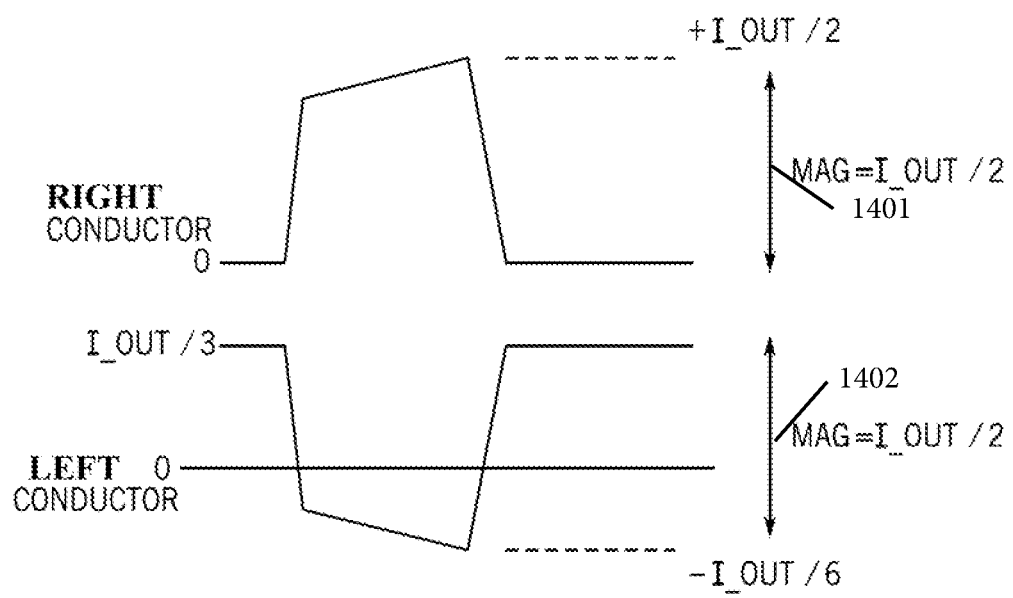
FIG. 14 is a representation of the current flowing with three DC collection points.

FIG. 14 illustrates the current flowing in the upper right anode conductor and upper portion of the left cathode conductor with 3 DC current collection points. It is assumed that the DC current splits into equal ⅓ portions (for illustration only). As the right anode current conductor increases from 0 to +I_OUT/2 and the right anode current conductor magnetic field increases from 0 to I_OUT/2 the left cathode conductor current is changing from +I_OUT/3 to −I_OUT/6 and the left cathode current conductor magnetic field decreases from 0 to −I_OUT/2. The magnitude change in current is the same as the right anode conductor but in the opposite polarity. The actual net current is not the same, but the effect of the changing current still results in a mutual inductance effect which provides for cancellation of the self-inductance.

Figure 15A:
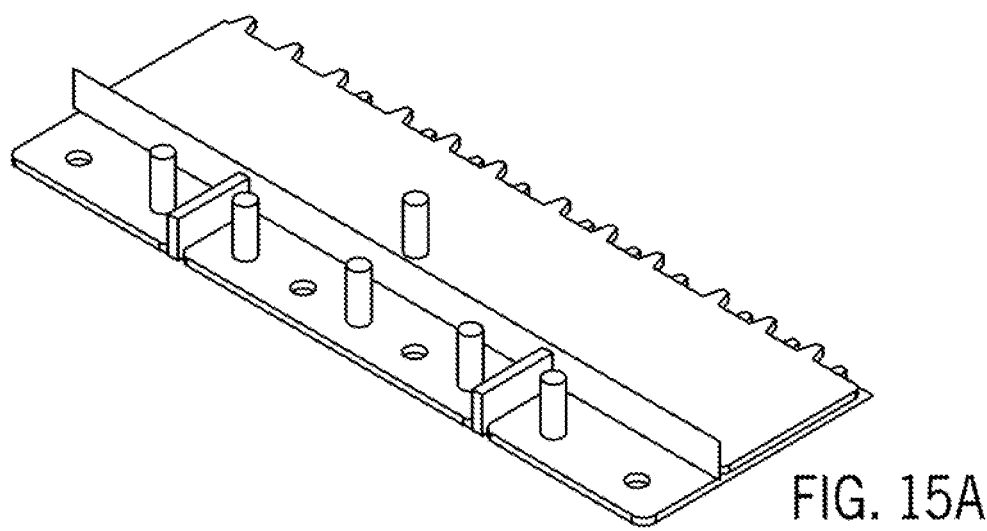
FIG. 15A is a representation of a laminated bus assembly with an implementation of the described conduction paths.
Figure 15B:
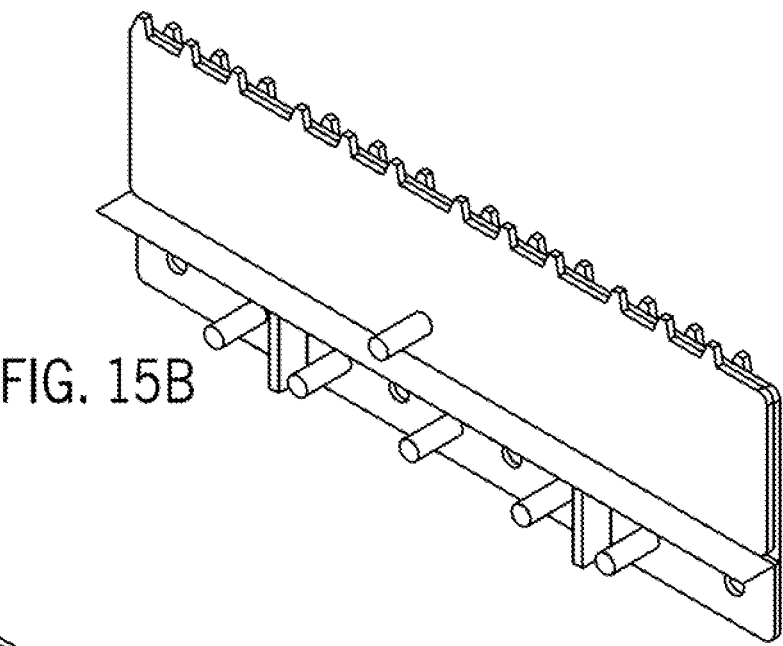
FIG. 15B is a representation of a laminated bus assembly with an implementation of the described conduction paths.
Figure 15C:
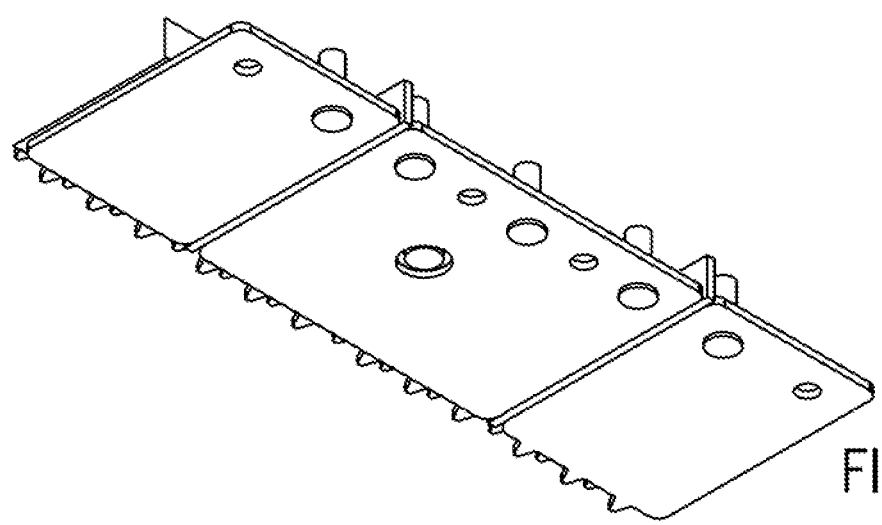
FIG. 15C is a representation of a laminated bus assembly with an implementation of the described conduction paths.

FIGS. 13 and 14 illustrate operation of the two forward conduction paths assuming the two converters are ON and operating in phase. A similar analysis can be done for the freewheel diode paths as well as the forward paths for phase shifted operation of the two forward converters FIGS. 15A, 15B and 15C shows a laminated bus assembly with an implementation of the described conduction paths. This assembly in conjunction with an associated PCB can provide an output rectifier assembly with low self-inductance and matched symmetry between the two forward converters.

Figure 16:
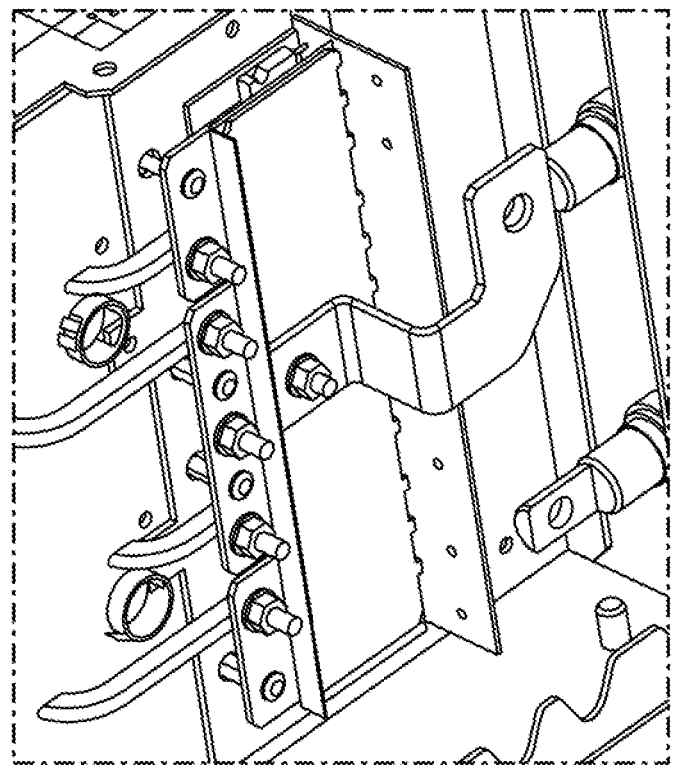
FIG. 16 is a view of a PCB in accordance with this disclosure.
Figure 17:
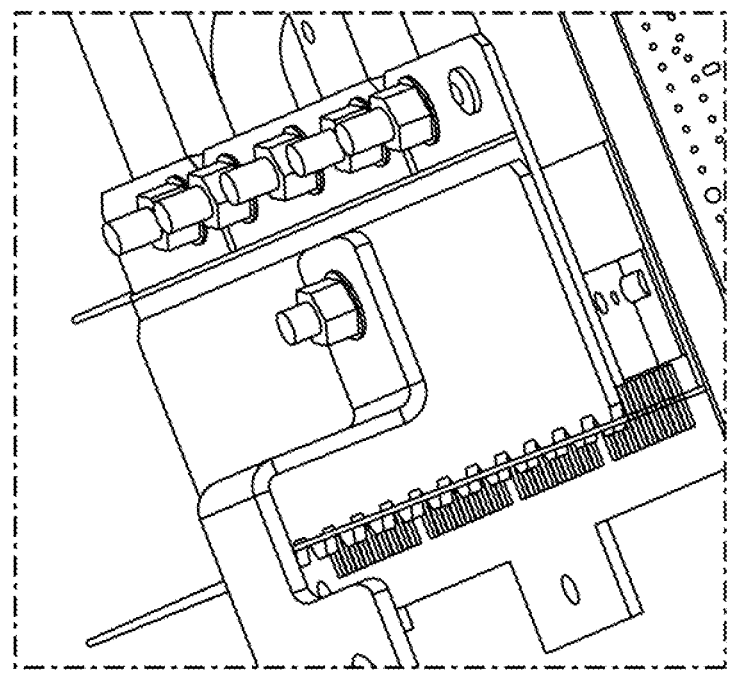
FIG. 17 is a view of a PCB in accordance with this disclosure.
Figure 18:
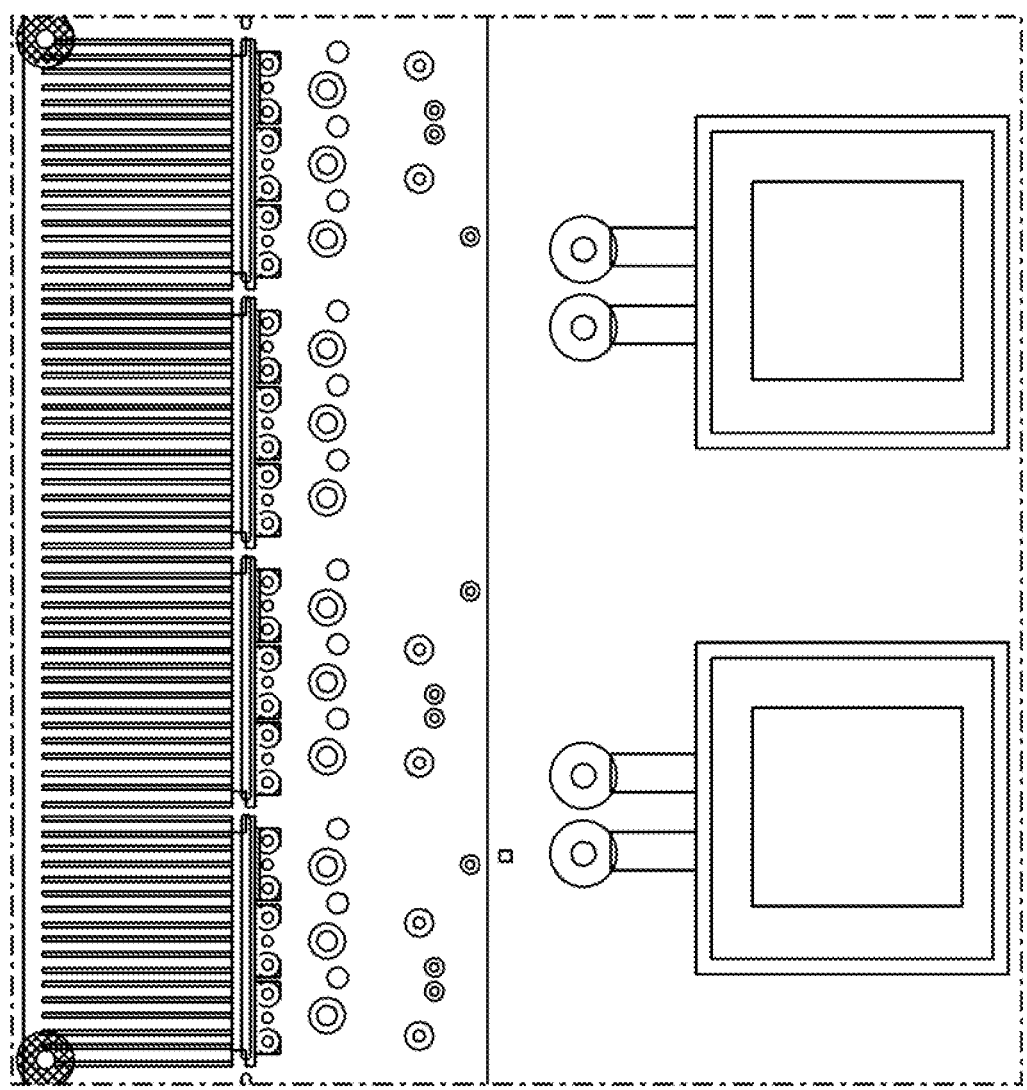
FIG. 18 shows the PCB top layer copper conductor (positive cathode conductor)
Figure 19:
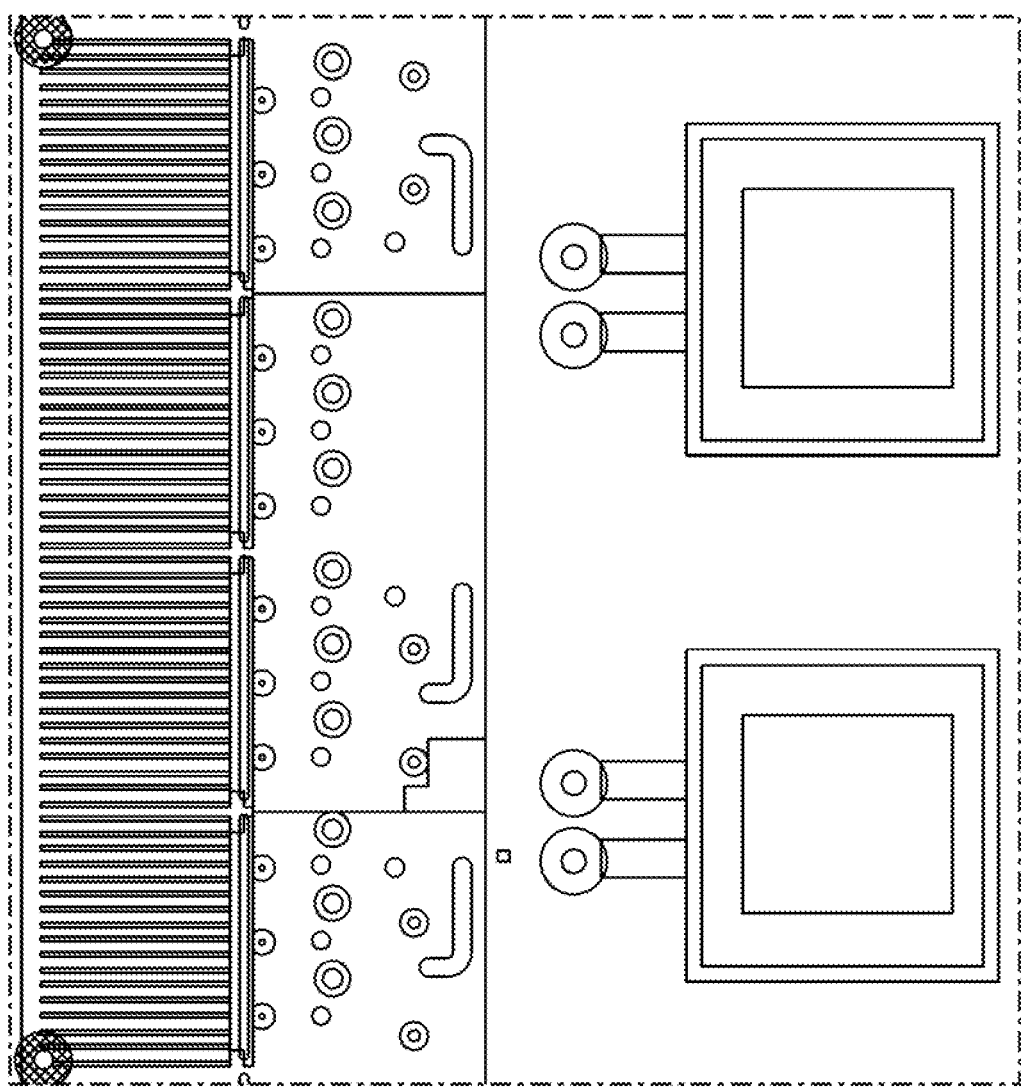
FIG. 19 shows the PCB bottom (anode) conductor layer.

FIGS. 16 and 17 shows a portion of a PCB in accordance with this disclosure. FIG. 18 shows the PCB top layer copper conductor (positive cathode conductor) and FIG. 19 shows the PCB bottom conductor layer.

Numerous modifications may be made to the present disclosure which still fall within the intended scope hereof. Thus, it should be apparent that there has been provided a method and apparatus for providing welding type power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A method of providing welding type power comprising:
receiving input power in a forward converter;
switching the forward converter to provide a converter output current;
rectifying the converter output current to provide at least a part of a welding type output current, wherein rectifying includes providing a first rectified current through a first rectified current path that includes a first cathode current path and a first anode current path, wherein when the first rectified current flows in the first cathode current path it creates a first cathode magnetic field, and wherein when the first rectified current flows in the first anode current path it creates a first anode magnetic field; and
at least partially cancelling the first anode magnetic field with the first cathode magnetic field.

2. The method of claim 1, wherein the first rectified current path is a freewheeling current path and wherein rectifying further includes providing a forward current through at least one forward current path, wherein the forward current path includes a forward cathode current path and a forward anode current path, wherein when the forward current flows in the forward cathode current path it creates a forward cathode magnetic field, and wherein when the forward current flows in the forward anode current path it creates a forward anode magnetic field at least partially cancelling the forward anode magnetic field with the forward cathode magnetic field.

3. The method of claim 2, further comprising cancelling the first anode magnetic field with the first cathode magnetic field and cancelling the forward anode magnetic field with the forward cathode magnetic field.

4. The method of claim 3, wherein providing the first rectified current through the first cathode current path includes providing the first rectified current at least partially through the forward cathode current path, and wherein providing the first rectified current through the first anode current path includes providing the first rectified current at least partially through the forward anode current path.

5. The method of claim 4, wherein providing the forward current through the forward cathode current path includes providing the forward current at least partially through the first cathode current path, and wherein providing the forward current through the forward anode current path includes providing the forward current at least partially through the first anode current path.

6. The method of claim 5, further comprising
receiving the input power in a second forward converter;
switching the second forward converter to provides a second converter output current;
wherein the forward converter and the second forward converter are arranged as a phase staggered dual forward converter, and wherein switching the forward converter and switching the second forward converter includes switching to provide a combined phase staggered dual forward converter output current;
rectifying the second converter output current to provide at least a second part of the welding type output current, wherein rectifying the second converter output current includes providing a second rectified current through a second rectified current path that includes a second freewheeling cathode current path and a second freewheeling anode current path, wherein when the second rectified current flows in the second freewheeling cathode current path it creates a second cathode magnetic field, and wherein when the second rectified current flows in the second freewheeling anode current path it creates a second anode magnetic field;
at least partially cancelling the second freewheeling anode magnetic field with the second freewheeling cathode magnetic field;
wherein rectifying the second converter output current further includes providing the second rectified current through a second forward cathode current path and a second forward anode current path, wherein when the second forward current flows in the second forward cathode current path it creates a second forward cathode magnetic field, and wherein when the second forward current flows in the second forward anode current path it creates a second forward anode magnetic field;
at least partially cancelling the second forward anode magnetic field with the second forward cathode magnetic field;
wherein the first anode current path, the forward anode current path, the second freewheeling anode current path, and the second forward anode current path are at least partially shared; and
wherein the first cathode current path, the forward cathode current path, the second freewheeling cathode current path, and the second forward cathode current path are at least partially shared.

7. The method of claim 6, wherein providing the first rectified current through the first cathode current path and the forward cathode current path includes providing the first rectified current through a first layer of at least one of a laminated bus and printed circuit board, and wherein providing the second rectified current through the second freewheeling cathode current path and the second forward cathode current path includes providing the first rectified current through the first layer of the at least one of a laminated bus and printed circuit board, and wherein providing the first rectified current through the first anode current path and the forward anode current path includes providing the first rectified current through a second layer of the at least one of a laminated bus and printed circuit board, and wherein providing the second rectified current through the second freewheeling anode current path and the second forward anode current path includes providing the second rectified current through the second layer of the at least one of a laminated bus and printed circuit board.

8. The method power supply of claim 7, wherein providing the first rectified current through the forward cathode current path and providing the second rectified current through the second freewheeling cathode current path includes providing the first rectified current and the second rectified current through multiple collection points.

\* \* \* \* \*